Dec. 15, 1953
P. T. ANGELL ET AL
2,662,450
MACHINE FOR MILLING IMPELLER WHEELS
Filed Nov. 26, 1948
2 Sheets-Sheet 1
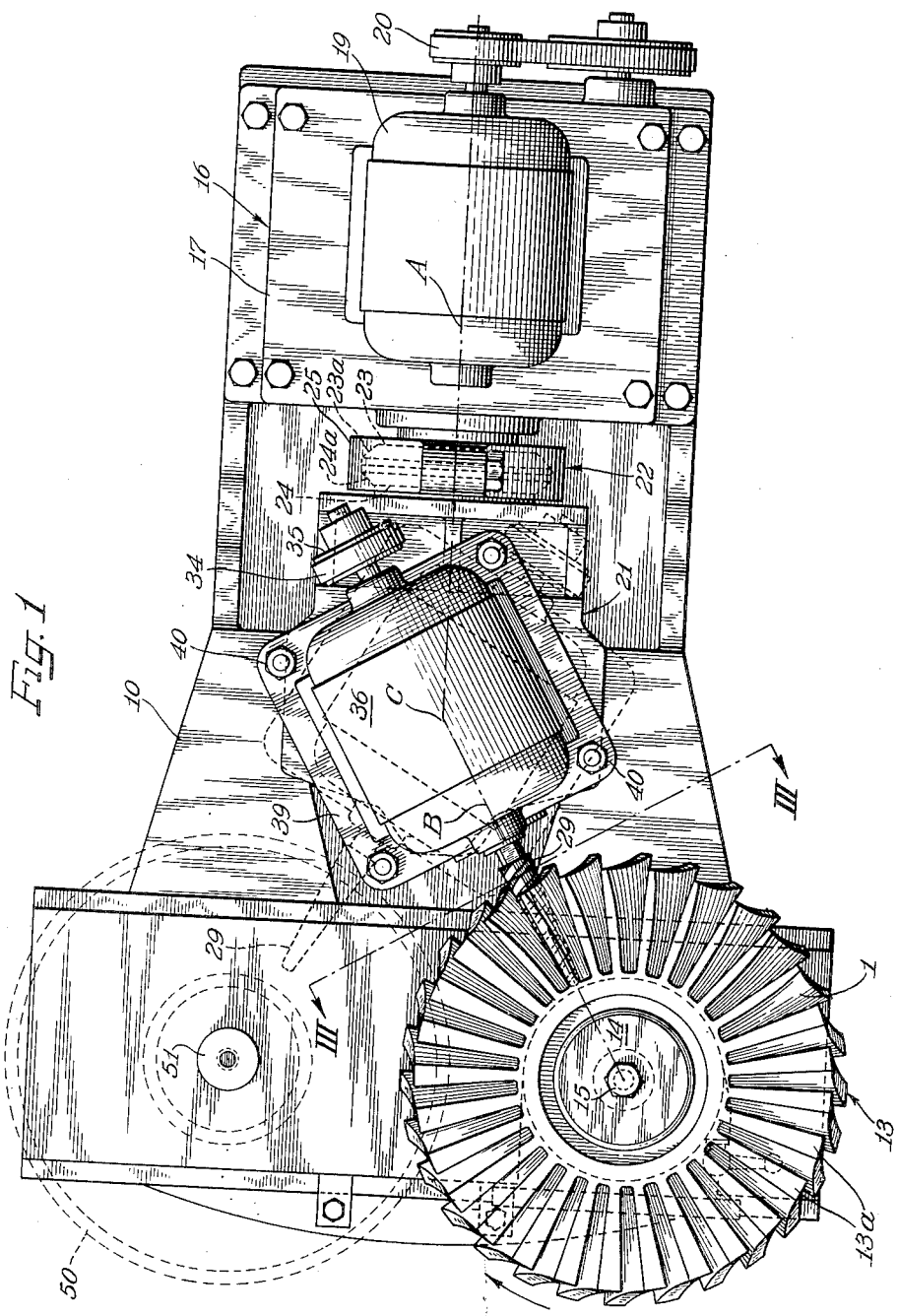
Inventors
Pierce T. Angell &
Charles D. Vaughn
The Firm of Charles W. Hills
Attys

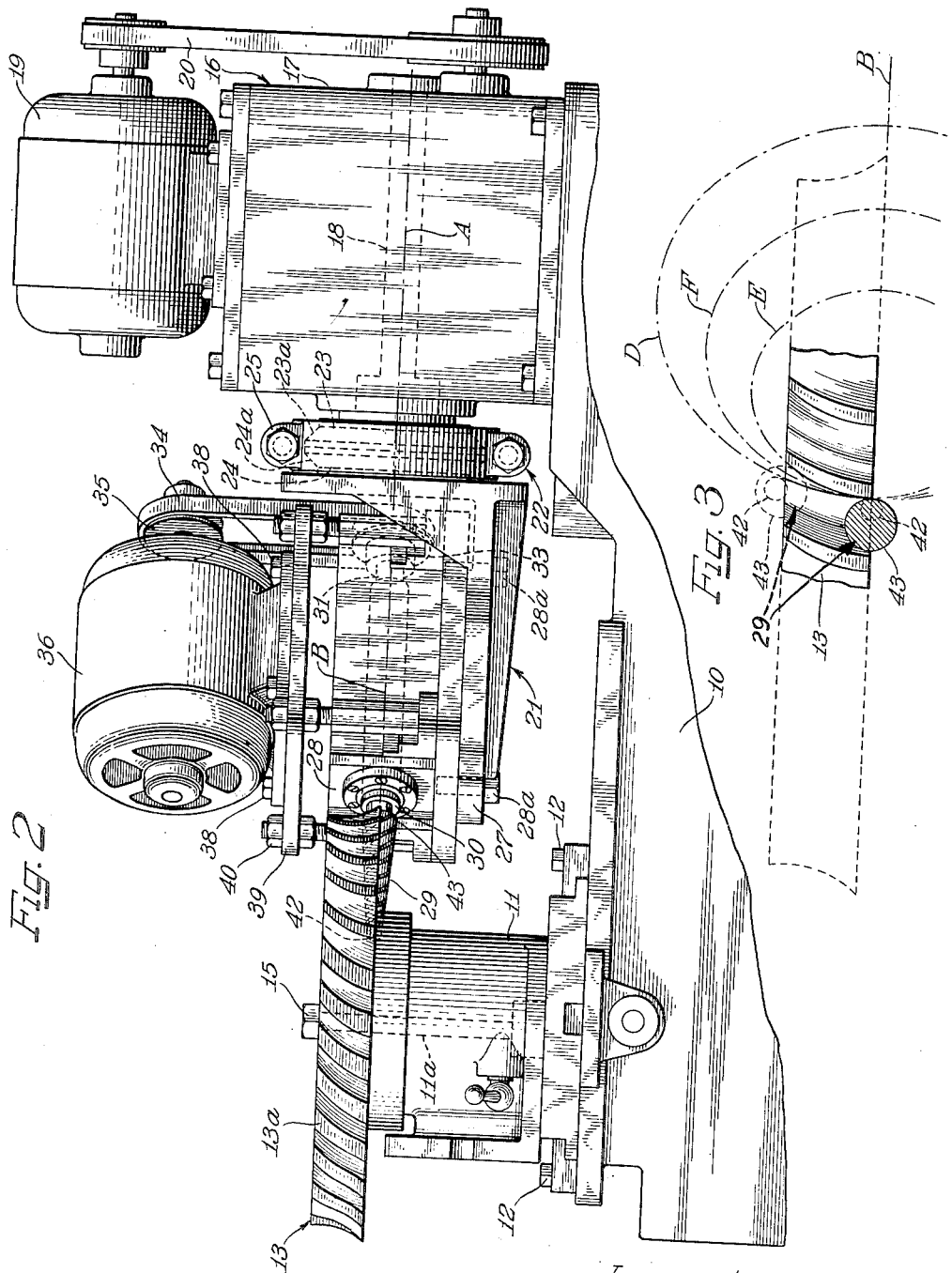

Patented Dec. 15, 1953

2,662,450

UNITED STATES PATENT OFFICE 2,662,450

MACHINE FOR MILLING IMPELLER WHEELS

Pierce T. Angell, Cleveland, and Charles D. Vaughn, Wickliffe, Ohio, assignors to Thompson Products, Inc., Cleveland, Ohio, a corporation of Ohio Application November 26, 1948, Serial No. 62,042

5 Claims. (Cl. 90—15.1)

1

This invention relates to an improved machine for milling impeller wheels or similar work pieces having a plurality of circumferentially spaced, radially extending vane surfaces, and particularly to a machine tool for rapidly and economically machining the blades of an impeller wheel.

The surfaces of vanes of an impeller wheel are of relatively complex configuration, for the most part having in cross sectional contour an arcuate configuration wherein the radius of curvature of successive portions of the contour vary substantially. After the blades have been roughed out from the cylindrical blanks and prior to the finishing operations which generate the finished complex curved surface on the blades, it has been found advantageous to employ an intermediate machining operation wherein a more or less uniform arcuate surface is provided on the blade, said surface constituting a segmental portion of a conical surface.

This invention has to do with an improved machine for milling the intermediate, segmental conical surface on the blade.

According to the features of the present invention, the impeller wheel blank with blades roughed out, is mounted in a stationary position on a vertical post, provision being made for indexing the wheel about the vertical post to successively position the blade location of the blank in the cutting position.

A bracket, mounted on a horizontal, motor driven spindle, carries a motor driven rotating spiral cutter which is mounted thereon in angular relation to the axis of the horizontal spindle. As the spindle rotates, the rotating spiral cutter is moved in a conical path and, upon passing between adjacent blades, a segmental conical surface is cut on one of the blades.

It is therefore an important object of the present invention to provide an improved machine tool which will accurately mill a uniform, segmental conical surface on the blade of an impeller wheel.

Another object of the present invention is to provide an improved machine for milling the contour of an impeller blade wherein a rotary cutting element is caused to move between two adjacent vanes of an impeller wheel along a conical path while the cutting element is independently rotated for milling the surface of one of the blades.

A still further object of the present invention is to provide a machine wherein a spiral cutter is mounted on a bracket in angular relation to the spindle on which the bracket is rotated

2 whereby the spiral cutter describes a conical cutting path for machining a segmental conical surface on the blade of an impeller wheel.

Other objects, features and advantages of the present invention will become apparent to one skilled in the art from the following description of the embodiment illustrated in the accompanying drawings.

On the drawings:

Figure 1 is a top plan view of the machine of the present invention, illustrating an impeller wheel mounted on the machine during the machining operation.

Figure 2 is a fragmentary side elevation of the machine of Figure 1.

Figure 3 is a fragmentary vertical sectional view taken substantially on line III—III of Figure 1 in a plane normal to the cutting edge of the cutter therein illustrated.

As shown on the drawings:

In Figures 1 and 2, the reference numeral 10 indicates generally a supporting base, at one end of which is secured, by bolts 12, an indexing fixture 11. The fixture 11 is provided with a vertical core or shaft 11a that may be indexed manually a predetermined number of degrees about the vertical axis thereof. A cylindrical blank 13, with roughed out radial blades 13a, is secured to the rotatable vertical shaft 11a, by a clamping plate 14 and a nut 15, so that the blank 13 will be indexed with the indexing core of the fixture 11.

The blank 13 herein illustrated and described is a blank for the inducer or rotating guide vane of a turbine. It is to be understood however that the machine of the present invention may be used for machining the surface of any similar blade. Consequently the work piece will hereinafter be referred to by the general term of impeller wheel.

At the opposite end of the support face 10, a drive assembly 16 is secured thereon, including a housing 17, a substantially horizontal spindle 18 journaled in the housing and a motor 19 mounted on the housing 17 and arranged to drive the spindle 18 through a belt drive 20 and suitable gears (not shown) disposed inside of said housing.

A bracket 21 is connected for rotation with the spindle 18 through a coupling 22 which may suitably comprise a collar 23 integrally formed on or fixedly attached to the spindle 18 and a similar collar 24 secured to or integrally formed on a vertical face of the bracket 21. The collars 23 and 24 have beveled peripheral edges 23a and 24a respectively against which internal beveled walls of a clamping ring 25 press to hold the collars together. If desired, the contacting faces of the collars may be notched or provided with friction surfaces which will insure rotation of the bracket 21 with the spindle 18.

Bracket 21 has a flat table-like platform 27 on which is suitably secured, a housing 28 by means of bolts 28a. The shank of a tapered spiral cutter 29 is removably held in a tool holder or chuck 30 extending from an end wall of the housing 28. A shaft 31, also connected to the tool holder 30, extends through the housing 28 and projects through the opposite end wall where it carries a pulley 33 which is driven through a belt 34 from a pulley 35 keyed to the shaft of a motor 36. The motor 36 is secured by bolts 38 to a platform 39 which is adjustably mounted above the platform 27 by adjusting screws 40.

In Figure 1 it will be seen that the center line A of the spindle 18 and the center line B of the cutter 29 meet at a point C. Also, as seen in Figure 2, the center lines A and B are in the same horizontal plane.

Thus, when the spindle 18 rotates the bracket 21, the movement of the cutter 29 describes a cone, the apex of which is at C.

It is further to be noted in Figures 2 and 3 that the center line B coincides in a horizontal plane with the lower edge of the bladed blank 13.

Figure 3 is a side view of the bladed blank 13 taken normal to the cutting edge of the tapered spiral cutter 29. In this view substantially conical paths D and E are defined by the extreme outer end 42 of the cutter and by the shank end 43 of the cutter respectively. An intermediate path F is described by an intermediate portion of the cutter. Since the shank end 43 travels in a shorter path than the extreme outer end 42, the blade will be cut with the outer end of the blade thinner than the base of the blade.

It will be understood, of course, that the rotation of the spindle 18 will be stopped just after the cutter leaves the blade. The direction of swing of the cutter 29 will then be reversed so that it will move back through the blank 13 to clear the other face of the blank. Then when the next blade is indexed to the cutting position, the cutter may again be swung for machining the face of the next blade.

As shown in Figure 1, the blank is being intermittently indexed clockwise about the vertical axis of the indexing head. Nine blades starting with blade 1 have been machined and the cutter 29 is moving downwardly to a position below the blank 13 to permit indexing of the blank. The tapering of the blade toward the outer edge is clearly illustrated in this view.

Provision is made in the present invention for machining either right hand or left hand impeller wheels. Thus, in dotted lines in Fig. 1, an impeller wheel blank 50 is illustrated on the fixture 11 showing the positioning of a wheel on a central positioning post 51. To arrange the machine for machining the blades of an impeller wheel on the post 51, the indexing head 11 will be bolted in position over the centering post 51 and the housing 28 can be adjusted on the platform 27 to move the housing 28 and motor 36 to the dotted line position of Fig. 1. Suitable adjustments must, of course, be made to coordinate the path of travel of the cutting tool with the blades of the impeller wheel.

It is within the scope of the present invention to provide automatic means for limiting the path of travel of the cutting tool, moving the cutting tool through its cutting path, and indexing the blades of the blank to the cutting position.

It is obvious of course that a cutter having straight sides or reversed tapered sides could be used instead of the tapered rotary cutter herein disclosed.

From the foregoing description, it is apparent that this invention provides a machine for economically and accurately machining the blades of an impeller wheel and applying thereon a segmental conical surface. The machine herein described not only performs its operation in an accurate, efficient manner but it is to be particularly noted that the machine construction is of unusual simplicity both in design and operation.

It will, of course, be understood that various details of construction may be modified through a wide range without departing from the principles of this invention and it is, therefore, not the purpose to limit the patent granted hereon otherwise than necessitated by the scope of the appended claims.

We claim as our invention:

1. In combination a supporting base, an indexing head on said base having a portion rotatable about a fixed axis, a drive housing secured to said base in spaced relation to said indexing head, a spindle journaled for rotation in one plane in said drive housing, a first motor drivingly connected with said spindle, a bracket carried by said spindle, a rotary cutting tool journaled on said bracket for rotation about an axis that intersects the axis of said spindle at a desired angle, a platform carried on said bracket, adjustable screws mounting said platform on said bracket, and a second motor secured on said platform having a driving connection to said rotary cutting tool, said tool extending from said bracket toward said indexing head for contacting a work piece secured thereon to cut a segmental conical surface as the first motor drives the spindle to rock the tool while the second motor rotates the tool about its own axis.

2. In combination a base, a power driven spindle mounted for rotation on said base having an axis of rotation spaced thereabove, a bracket secured to said spindle for movement therewith, a rotary cutter journaled on said bracket for rotation about an axis that intersects the axis of said spindle, a platform adjustably mounted on said bracket and spaced thereabove, a motor mounted on said platform and a drive member connecting said motor to said rotary tool for driving the same.

3. A milling machine comprising a supporting spindle, a table carried by said spindle, a tool chuck rotatably supported on said table, a motor on said table for driving said tool chuck, said tool chuck and said spindle lying in a single plane at an angle to each other whereby rotation of the spindle will swing the chuck through an arc centered on the axis of rotation of the spindle, and a work support table rotatable in a plane parallel to the axis of said spindle and positioned to carry a work piece in the path of a cutter tool carried by said chuck.

4. In combination a supporting base, an indexing head on said base having a portion rotatable about a fixed axis, a drive housing secured to said base in spaced relation to said indexing head, a spindle journaled for rotation in one plane in said drive housing, a first motor drivingly connected with said spindle, a bracket carried by said spindle, a rotary cutting tool journaled on said bracket for rotation about an axis that intersects the axis of said spindle at a desired angle, a platform carried on said bracket, adjustable screws mounting said platform on said bracket, and a second motor having on said platform a driving connection to said rotary cutting tool, said tool extending from said bracket toward said indexing head for contacting a work piece secured thereon to cut a segmental conical surface as the first motor drives the spindle to rock the tool while the second motor rotates the tool about its own axis.

5. In combination a base, a power driven spindle mounted for rotation on said base having an axis of rotation spaced thereabove, a bracket secured to said spindle for movement therewith, a rotary cutter journaled on said bracket for rotation about an axis that intersects the axis of said spindle, a platform adjustably mounted on said bracket and spaced thereabove, a motor and a drive member mounted on said platform connecting said motor to said rotary tool for driving the same.

PIERCE T. ANGELL.
CHARLES D. VAUGHN.

References Cited in the file of this patent

UNITED STATES PATENTS

| Number | Name | Date |
|---|---|---|
| 953,059 | Roberts | Mar. 29, 1910 |
| 2,126,990 | Graves | Aug. 16, 1938 |
| 2,269,200 | Hillner | Jan. 6, 1942 |
| 2,286,821 | Libby | June 16, 1942 |

FOREIGN PATENTS

| Number | Country | Date |
|---|---|---|
| 568,575 | Great Britain | Apr. 11, 1945 |